(12) United States Patent
Kim

(10) Patent No.: US 7,513,938 B2
(45) Date of Patent: Apr. 7, 2009

(54) WET TYPE AIR CLEANER

(75) Inventor: Woong Kim, Seoul (KR)

(73) Assignee: Daewoo Electronics Corp., Seoul (KR)

( * ) Notice: Subject to any disclaimer, the term of this patent is extended or adjusted under 35 U.S.C. 154(b) by 692 days.

(21) Appl. No.: 11/289,283

(22) Filed: Nov. 30, 2005

(65) Prior Publication Data

US 2006/0185518 A1 Aug. 24, 2006

(30) Foreign Application Priority Data

Feb. 22, 2005 (KR) .................. 10-2005-0014657

(51) Int. Cl.
*B01D 47/00* (2006.01)
(52) U.S. Cl. ............... 96/281; 96/282; 96/283; 96/284; 96/285; 96/286; 96/287; 95/218
(58) Field of Classification Search ........... 95/218; 96/281–287
See application file for complete search history.

(56) References Cited

U.S. PATENT DOCUMENTS 3,421,745 A * 1/1969 Prupis .................. 261/35

3,552,097 A * 1/1971 Grasseler .................. 96/282

FOREIGN PATENT DOCUMENTS

| CA | 1242386 | 9/1988 |
| DE | 20312576 | 11/2003 |
| WO | 99/15258 | 4/1999 |
| WO | WO 99/15258 | * 4/1999 |

* cited by examiner

*Primary Examiner*—Duane S Smith
*Assistant Examiner*—Ives Wu
(74) *Attorney, Agent, or Firm*—Bacon & Thomas, PLLC

(57) ABSTRACT

A wet type air cleaner includes a housing accommodating therein water; a blower having a fan for downwardly transferring air, installed above the water in the housing; an outer guide portion for transferring the air downwardly transferred by the blower into the water, connected to the blower as a unit; a driving unit for rotating the blower and the outer guide portion as a unit; and a plurality of discharge holes formed on a circumferential bottom surface of the outer guide portion. The air downwardly transferred by the blower is dispersed into the water in the housing through the discharge holes.

7 Claims, 3 Drawing Sheets

WET TYPE AIR CLEANER

FIELD OF THE INVENTION

The present invention relates to a wet type air cleaner; and, more particularly, to a wet type air cleaner with a negative ion generator, which is capable of reducing a noise and also achieving a maximum amount of clean air with a minimum sized air cleaner by increasing a supply amount of outside air, wherein the supply amount thereof is increased due to a blowing path widened by forming as a unit an inner guide portion for dispersing washing water in a water tank and an outer guide portion for supplying the outside air and also by increasing a diameter of the outer guide portion to a maximum length.

BACKGROUND OF THE INVENTION

In general, an air cleaner serves to purify indoor air containing fine dusts, various noxious gases, various germs, molds, viruses, etc., by using a purification medium. Such an air cleaner can be used through all seasons because it has various functions of removing unpleasant odors and small particles such as ticks, pollen and furs of pets, preventing an outbreak of disease due to an aerial infection, and so forth as well as its principal function of maintaining indoor air clean and pleasant.

Air cleaners can be largely classified into two types: dry type and wet type. Dry type air cleaners can be divided again into a filter type and an electric dust collection type.

Here, the electric dust collection type uses no filter, so it has a merit in that there is no need to replace filters. However, if dusts are accumulated on an electric dust collecting plate, purifying efficiency of the air cleaner will be deteriorated, and dust removing capacity thereof will also be undermined.

As for the filter type air cleaner, on the other hand, since various fine particles are captured while air passes through filters, the filter type air cleaner exhibits a high purifying efficiency, and thus is adequate for use in a season when yellow dust comes. However, since the filters need to be replaced periodically, maintenance cost thereof is high.

Meanwhile, a wet type air cleaner employs a method for making floating particles in suctioned air deposited in water by allowing the suctioned air to contact water. Though the wet type air cleaner has not been commonly utilized yet, it has many advantages in that it does not requires a replacement of filters and generates little noise, while providing a humidifying function as well. Thus, for children, its use is preferred. However, when using the wet type air cleaner, water should be replaced or replenished, which would be rather cumbersome.

In order to solve the above-mentioned problems, there is suggested a wet type air cleaner having a simple structure in which cleaning water is stored in a certain space, and a blower unit and a water spray unit are installed in a same space. One of such wet type air cleaners is disclosed in Japanese Patent Laid-open Publication No. 2000-334240, entitled "WET TYPE AIR CLEANER".

The wet type air cleaner includes an air circulation passage through which air is introduced into the inside of the air cleaner and then is outputted to the outside after being purified. A reservoir containing therein liquid to be sprayed is formed in a part of the air circulation passage. The air cleaner further includes a blower unit for allowing the air to be circulated through the air circulation passage and a spray unit for spraying the liquid into a spray space in the reservoir.

The blower unit includes a fan for suctioning the air into the spray space and a motor for driving the fan. The spray unit includes a pump for pumping up the liquid from the reservoir and a nozzle for spraying the liquid into the spray space.

Further, the air supplied into the air circulation passage typically flows downward after being introduced into the reservoir from upside, whereas the liquid is sprayed upward from downside. Therefore, the air introduced into the reservoir is brought into contact with fine liquid particles sprayed by the nozzle, thereby allowing noxious substances in the air to be adsorbed by the liquid.

In the conventional wet type air cleaner as described above, however, droplets containing collected dirt particles are discharged to the outside air of the air cleaner with a flow of clean air and, thus, a cleaning effect deteriorates. Further, a humidity level increases more than a set value, which dissatisfies users.

Moreover, in the conventional wet type air cleaner, water is injected on a wall surface of the product to collect dirt or the like, thereby increasing an operating noise.

In order to enhance the cleaning effect, a contact area of air containing injected water, dirt or the like needs to be increased. However, a comparatively small contact area between air and water deteriorates the cleaning effect.

In addition, a component purchase price increases by separately installing a pump for transferring water to an upper side and a motor for driving a fan for sucking air. And also, a simultaneous operation of the pump and the fan increases the operating noise during the operation.

SUMMARY OF THE INVENTION

It is, therefore, a primary object of the present invention to provide a wet type air cleaner capable of maximizing a negative ion generating effect as well as an air cleaning function by way of increasing a contact area between water particles and air and also capable of solving a problem in which a component cost increases by separately installing a pump for pumping up water and a motor for driving a fan.

It is another object of the present invention to provide a wet type air cleaner capable of overcoming drawbacks in that since droplets containing collected dirt particles are discharged to outside air of the air cleaner with a clean air flow, a cleaning effect deteriorates and a humidity level increases above a set value.

It is still another object of the present invention to provide a wet type air cleaner capable of solving a problem of an operating noise increased by injecting water on a wall surface of the product to collect dirt or the like.

It is still another object of the present invention to provide a wet type air cleaner capable of cleaning air in a comparatively wide space with a small-sized air cleaner by increasing the amount of air to be discharged per unit time, wherein a path is improved to increase the amount of air to be discharged to an outside of the air cleaner to a maximum extent.

In accordance with the present invention, there is provided a wet type air cleaner including: a housing accommodating therein water; a blower having a fan for downwardly transferring air, installed above the water in the housing; an outer guide portion for transferring the air downwardly transferred by the blower into the water, connected to the blower as a unit; a driving unit for rotating the blower and the outer guide portion as a unit; and a plurality of discharge holes formed on a circumferential bottom surface of the outer guide portion, wherein the air downwardly transferred by the blower is dispersed into the water in the housing through the discharge holes.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENTS

Hereinafter, a preferred embodiment of a wet type air cleaner in accordance with the present invention will be described in detail with reference to the accompanying drawings.

Figure 1:
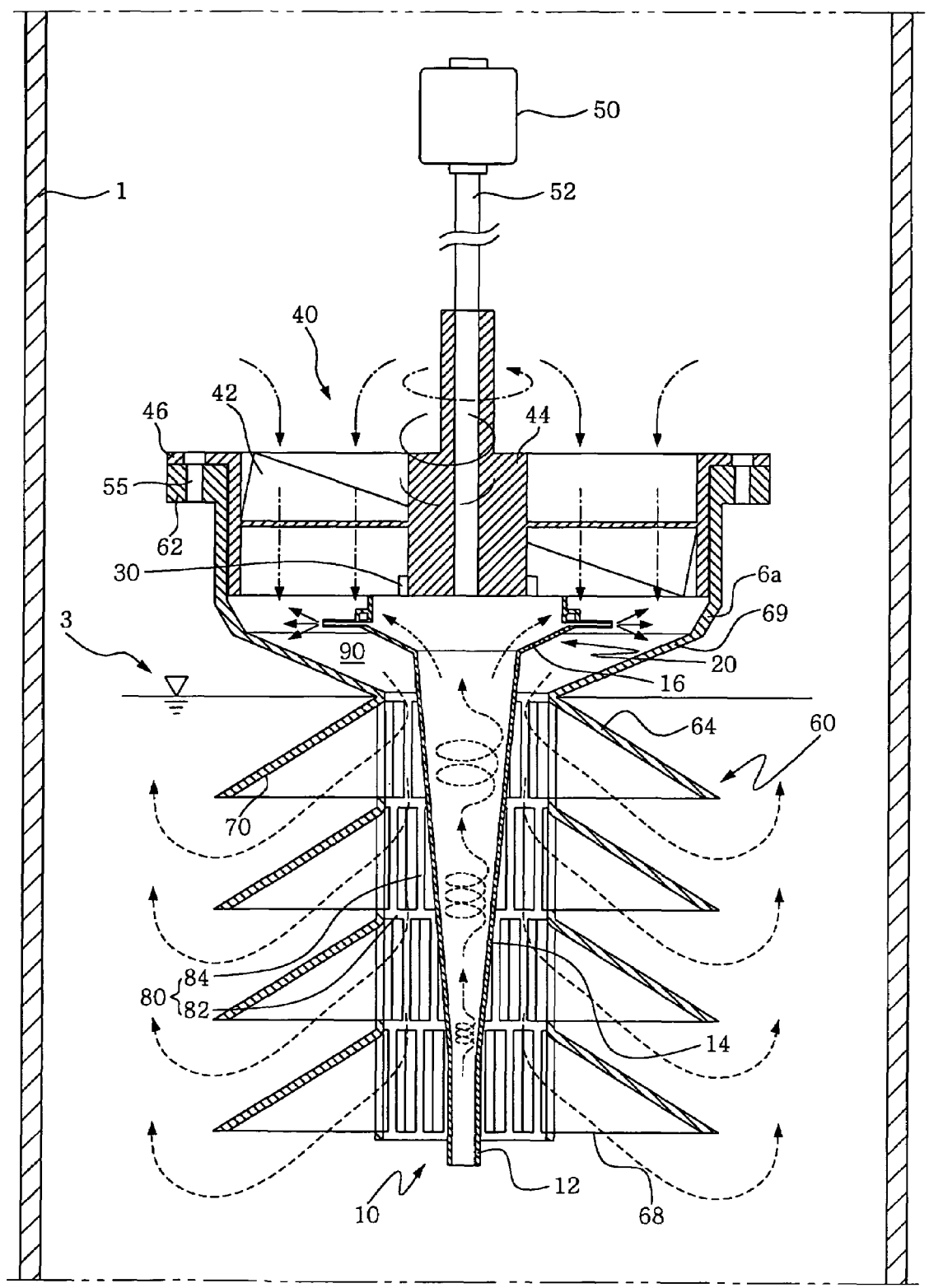
FIG. 1 shows a cross sectional view of a wet type air cleaner in accordance with the present invention.
Figure 2:
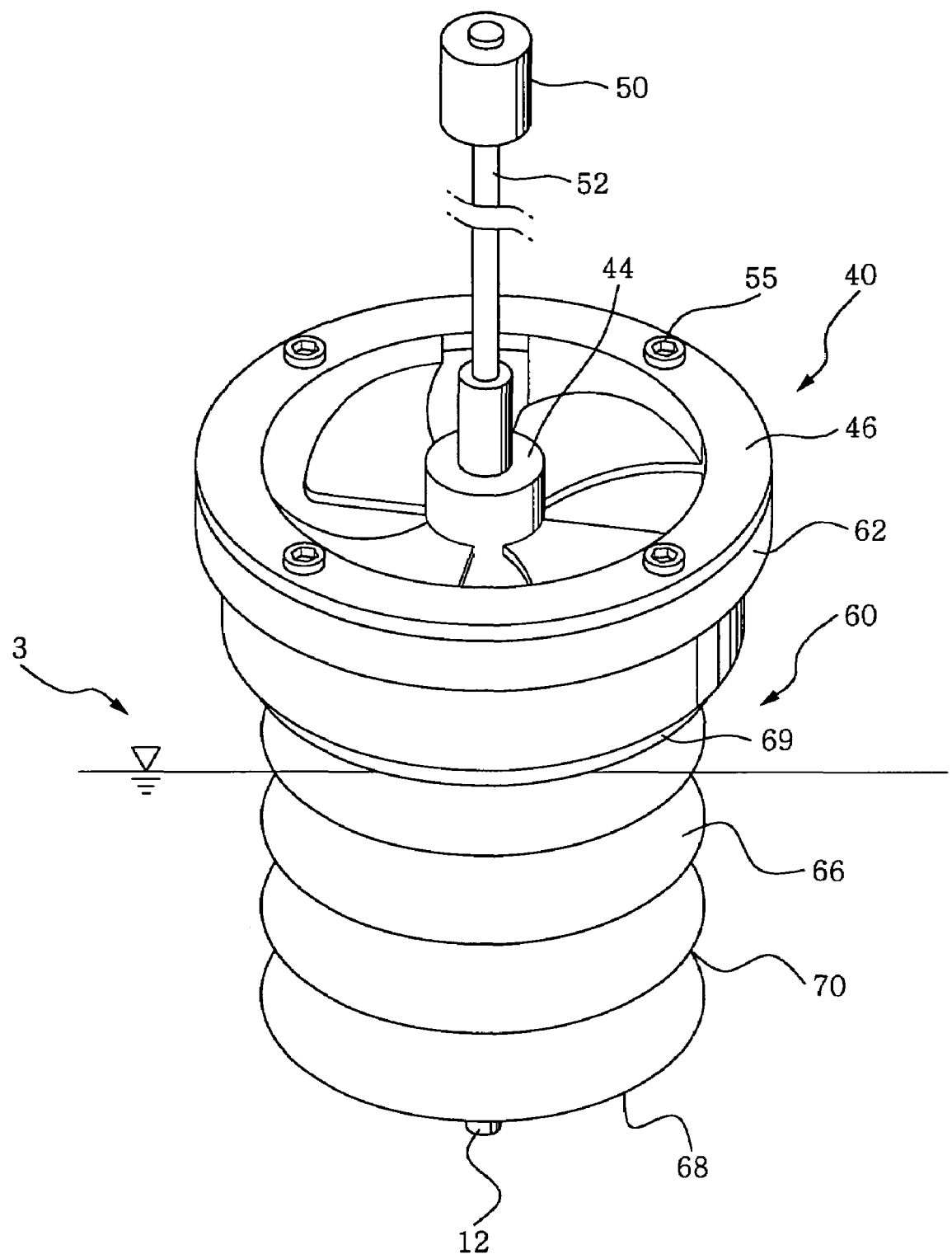
FIG. 2 describes a perspective view of the wet type air cleaner in accordance with the present invention.

FIG. 1 shows a cross sectional view of the wet type air cleaner in accordance with the present invention; and FIG. 2 describes a perspective view of the wet type air cleaner in accordance with the present invention.

The housing 1 provided with air inlets (not shown) and air outlets (not shown) of the wet type air cleaner in accordance with the present invention contains therein water 3. Further, a lower portion of a funnel shaped inner guide portion 10 is submerged into the water 3 of the housing 1, the funnel shaped inner guide portion 10 having a cross sectional area becoming wider toward an upper portion thereof.

An inlet opening 12 for introducing the water 3 is formed at a lower end of the inner guide portion 10. Further, formed at an upper portion of the inlet opening 12 is an inner lower inclined portion 14 inclined outwardly at a predetermined angle.

Formed at an upper portion of the inner lower inclined portion 14 is an inner upper inclined portion 16 having a gentle inclined angle compared to the inner lower inclined portion 14.

A water spraying unit 20 is connected to an upper end of the inner guide portion 10 while communicating with an outside so that water that has been upwardly transferred along the inner guide portion 10 can be sprayed to the outside, wherein the water spraying unit 20 is formed along a circular arc.

A rotating engagement 44 of a blower 40 is fixedly inserted into a hollow engaging portion 30 connected to the top side of the water spraying unit 20.

A circular arc shaped fan 42 is so that a center thereof is aligned with the rotating engagement 44. Further, an upper coupling unit 46 having therein a coupling hole is provided at a frame surrounding an outer portion of the fan 42.

An upper end of the rotating engagement 44 is connected to the rotation shaft 52 for transferring a rotary power of the motor 50 serving as a driving unit, thereby rotating the blower 40.

A lower coupling unit 62 of the outer guide portion 60, which is coupled with the upper coupling unit 46 by a screw 55, also has therein a coupling hole.

An outlet opening 68 having a cross sectional area becoming wider toward a lower portion thereof is provided at a lower end of the outer guide portion 60. Further, an outer lower inclined portion 64 is so installed as to be narrower toward an upper portion thereof at a predetermined angle.

Formed at an upper portion of the outer lower inclined portion 64 is an outer upper inclined portion 66 inclined outwardly at a predetermined angle. Further, an upwardly inclined plate 69 is slantingly installed at a portion corresponding to a side surface of the water spraying unit 20, so that water sprayed from the water spraying unit 20 can be dispersed to the fan 42 after being collided with the upwardly inclined plate 69.

The outer guide portion 60 is spaced from the inner guide portion 10 so that air downwardly transferred by the blower 40 and water sprayed from the water spraying unit 20 can be transferred through a first area 90 into the water 3.

In the aforementioned configuration, since the inner guide portion 10, the water spraying unit 20, the blower 40 and the outer guide portion 60 are connected as a unit, they rotate as a unit by operating the motor 50.

The air cleaner is installed such that a vicinity of a boundary where the outer lower inclined portion 64 and the outer upper inclined portion 66 meet is under the water 3.

Meanwhile, the inlet opening 12 formed at the lower end of the inner guide portion 10 is more extended downwardly than the outlet opening 68 formed at the lower end of the outer guide portion 60. With such configuration, contaminated water exhausted from the outlet opening 68 can be prevented from going up through the inlet opening 12.

In addition, a plurality of discharge holes 70 is formed on a circumferential surface of the outer guide portion 60, thereby increasing the amount of air to be discharged. By installing a plurality of outer guide portions 60 of a comparatively short length in a vertical direction at regular intervals, gaps between the respective outer guide portions 60 form the discharge holes 70. Thus, the discharge holes 70 are formed on the circumferential surface of the outer guide portions 60.

As a result, air supplied from the blower 40 flows downwardly after the contact with water dispersed from the water spraying unit 20 and then is discharged to the housing 1 through the discharge holes 70 and the outlet opening 68 provided at a lowermost end thereof.

At this time, the discharge holes 70 serve to widen an area of the outlet opening 68. Therefore, when the blower 40 is driven with a same output, the amount of blowing air passing through the outer guide portions 60 remarkably increases compared to an outer guide portion having no discharge hole 70.

Besides, by installing the plurality of outer guide portions 60, the length of the outer guide portions 60 becomes short, thereby enabling to form a gentle inclined angle of the outer lower inclined portion 64. Therefore, in comparison with the outer guide portion 60 having no discharge hole 70, the area of the outlet opening 68 is substantially widened.

As described above, in the outer guide portions 60 of the present invention, the area of the outlet opening 68 is widened to a maximum extent and, further, the plurality of discharge holes 70 are formed. Thus, the amount of air passing through the first area 90 per unit time increases to a maximum extent and, accordingly, a contact area between the air and the water dispersed from the water spraying unit 20 also increases. As a result, toxic substances in the air can be effectively adsorbed.

Further, since air discharged out into the water through the outlet opening 68 is distributed into the discharge holes 70, an injection pressure in each outlet decreases. Moreover, since a portion where the outer guide portion 60 is contacted with water is also distributed, a water flow is reduced and, further, a noise generated by a rotation of the outer guide portion 60 is also reduced.

Figure 3:
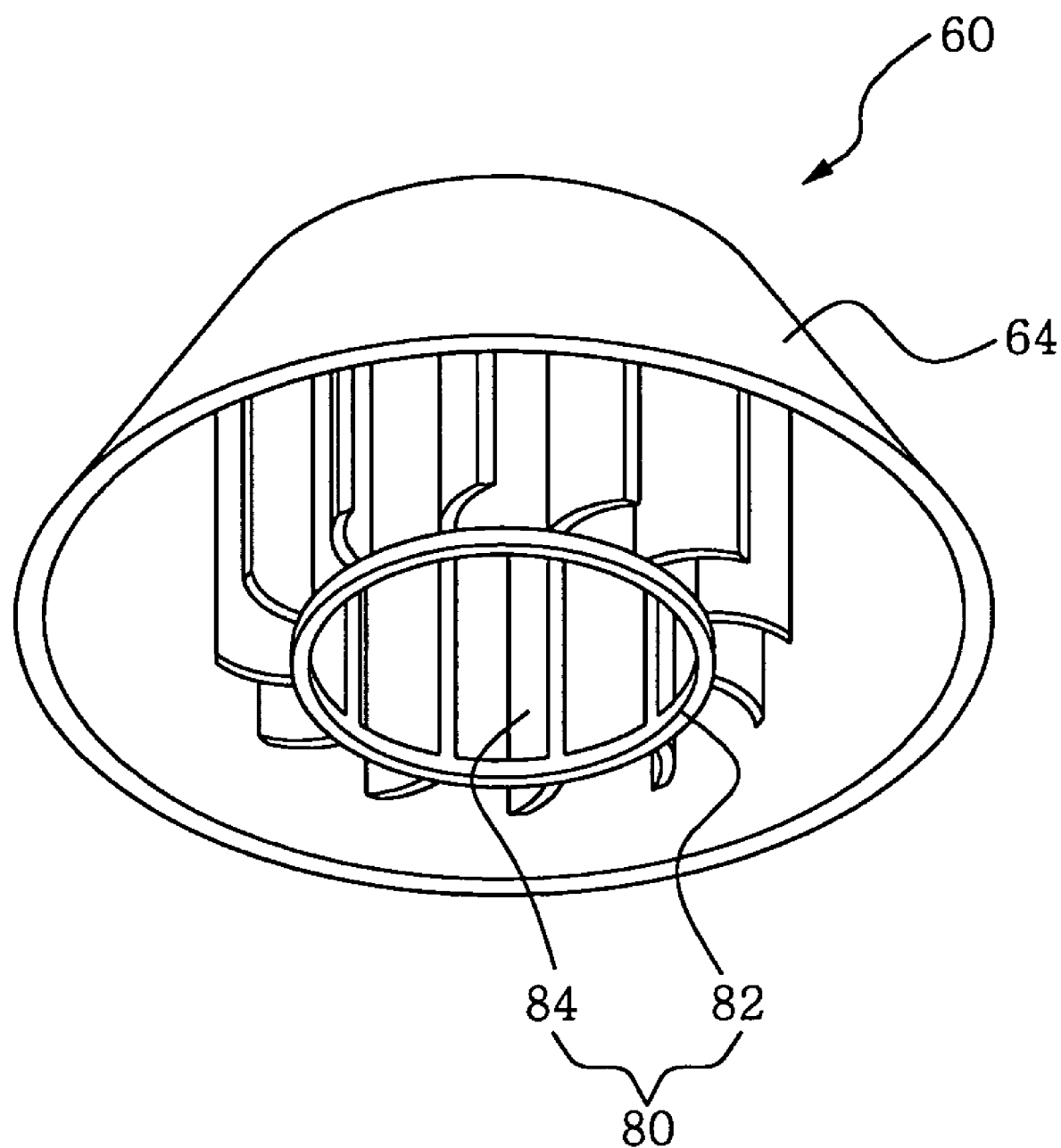
FIG. 3 offers a perspective view of a connecting unit of the wet type air in accordance with the present invention.

FIG. 3 provides a perspective view of a connecting unit of the wet type air cleaner in accordance with the present invention.

A connecting unit 80 is provided between the outer guide portions 60, wherein the connecting unit 80 includes a fixing ring 82 formed as a unit with an upper end of the outer guide portion 60 and supporting plates 84 for being connected to the fixing ring 82 in a vertical direction.

Herein, the fixing ring 82, i.e., a reinforcing rib formed at the upper end of the outer guide portion 60, has a same diameter as that of the upper end of the outer guide portion 60. Further, since the fixing ring 82 is united with the outer guide portion 60 in a gentle curved surface, air passing through the first area 90 is not interfered, thereby enabling to prevent discharged air from flowing in whirls.

Furthermore, the fixing rings 82 are formed at upper and lower ends of the supporting plates 84 as a unit, so that strength of connecting portion between the fixing ring 82 and the supporting plate 84 can be enhanced. As a result, even if the air cleaner is used for a long time, the outer guide portion 60 can be free from damages.

The supporting plates 84 serving as members for being connected to the fixing rings 82 are installed at a regular interval, so that air flowing between the supporting plates 84 can be discharged into the housing 1 through the discharge holes 70. The supporting plates 84 are formed in a panel shape identical to a wing shape of a fan and also arranged at the regular interval toward the discharge holes 70. When the outer guide portion 60 rotates by the motor 50, the supporting plates 84 rotate while functioning as a fan. Accordingly, air introduced through the blower is accelerated and further can be more effectively discharged through the discharge holes 70.

The increased amount of air discharged through the discharge holes 70 and the outlet opening 68 maximizes the amount of air to be contacted with water dispersed per unit time, thereby improving an efficiency of the air cleaner.

Hereinafter, an operation of the wet type air cleaner in accordance with the present invention will be described.

First of all, a rotary power generated by the motor 50 is transferred to the rotating engagement 44 of the blower 40 via the rotation shaft 52.

Accordingly, the blower 40 rotates and, further, the fan 42 formed as a unit therewith introduces air in an upper side while rotating and then moves the introduced air to a lower side of the blower 40.

In the meantime, the inner guide portion 10 fixed to the blower 40 by the engaging portion 30 also rotates. Consequently, the water 3 introduced from the inlet opening 12 is upwardly transferred via the inner lower inclined portion 14 and the inner upper inclined portion 16 by a centrifugal force.

The upwardly transferred water 3 is outwardly sprayed by the water spraying unit 20. When the sprayed water is contacted with air that has been transferred to the lower side of the blower by the fan 42, bacteria, dirt or the like in the air are collected and, further, a gaseous contaminant in the air also dissolves. As a result, the air becomes clean.

In case water is finely sprayed, a large amount of air with negative ions is generated due to the Lenard effect. The amount of thus generated negative ions is greater than negative ions generated by a high-pressure discharge and, also, such generated air with negative ions is close to a natural state.

Meanwhile, the water from the water spraying unit 20 is collided with the upwardly inclined plate 69 and then mixed with air secondarily. Since a space including the upwardly inclined plate 69 is a partitioned, it is possible to minimize an outward transfer of the noise generated by the collision between the upwardly inclined plate 69 and the sprayed water. Consequently, a quiet working environment can be secured.

Moreover, the water that has been upwardly dispersed to be adhered to the fan 42 after being collided with the upwardly inclined plate 69 meets air by a high-speed rotation of the fan 42. Due to a friction and a static elasticity generated therebetween, foreign substances in the air are collected by the water.

As described above, the outer guide portion 60 and the fan 42 rotate as a unit, and air containing and water particles are downwardly transferred along the outer upper inclined portion 66 by a centrifugal force.

The air containing water and moisture that have been downwardly transferred along the outer upper inclined portion 66 are transferred toward the lower outlet opening 68 by the centrifugal force after passing through the first area 90 along the outer lower inclined portion 64. At this time, droplets or water particles in the air are mixed with the water 3 and, then, only clean air is elevated above the water through the outlet opening 68.

The aforementioned water and air passing through the outer lower inclined portion 64 are mixed with each other by the centrifugal force generated from the rotation of the outer guide portions 60, so that foreign substances in the air can be collected by water and then removed.

In the meantime, the outer guide portions 60 rotate with the blower 40 by the motor 50. Further, the air passing through the first area 90 is discharged under water via the outlet opening 68 and the discharge holes 70. Since the outer lower inclined portion 64 is gently inclined sideward to the maximum extent without interfering an inner surface of the housing 1, an area of the outlet opening 68 can be widened to a maximum extent. Further, by forming a plurality of discharge holes 70, an air discharge channel is maximized and, thus, the amount of air passing through the air cleaner increases. Accordingly, the amount of air to be contacted with the dispersed water increases, thereby improving an efficiency of the air cleaner.

Furthermore, by forming a plurality of discharge holes 70, an area between the outer guide portions 60 and water is distributed and, further, an air channel to be discharged into water is also distributed. Thus, discharge pressures of the respective discharge holes 70 and the outlet opening 68 decrease and, accordingly, water movement generated in the air cleaner is reduced. Consequently, a noise generated during a driving of the air cleaner is also reduced.

Besides, since the connecting unit 80 for supporting the plurality of outer guide portions 60 includes the fixing ring 82 and the supporting plates 84, the outer guide portions 60 can be firmly connected. Therefore, even if the air cleaner is driven for a long time, the connecting portion between the outer guide portions 60 can be free from damages. As a result, it is possible to reduce a cost required for managing and repairing the air cleaner and for exchanging components thereof.

In addition, since the supporting plates 84 are formed in a wing shape of the fan, air passing through the discharge holes 70 is accelerated and further can be effectively discharged, thereby improving the efficiency in cleaning air.

As described above, in accordance with the preferred embodiment of the present invention, only with the power of the motor 50 for rotating the fan 42, it is possible to rotate the fan 42 and to pump up water along the inner guide portion 10. Accordingly, an additional unit for pumping up water is not required, thereby achieving a cost reduction.

By contacting air that has been downwardly transferred to clean air with water multiple times, contaminated substances and moisture in the air are collected by the water and, then, only clean air is discharged to the outside, which can double the air cleaning effect. Further, if water is dispersed multiple times, the generation of negative ions also increases.

As described above, in accordance with the wet type air cleaner with the negative ion generator of the present invention, contaminated air particles move downwardly, whereas dispersed water moves upwardly, which increases a contact area of water. Further, by stirring water and air with the rotation of the air cleaner and also by dispersing water multiple times with a centrifugal force, a contact area between the water particles and the air increases. Accordingly, a negative ion generating effect as well as an air cleaning effect is maximized. Furthermore, by operating functions of a pump and a fan with a single driving unit, it is possible to reduce a component cost and shorten a manufacturing process.

Moreover, droplets containing collected dirt particles are guided into water along the outer guide portions with an air flow that has been cleaned and, the only clean air is discharged outside. Consequently, it is possible to solve a problem in which a humidity level is increased above a set value during a driving of the air cleaner without intention and, thus, a user satisfaction can be improved.

Besides, since water sprayed from the water spraying unit is collided with the upwardly inclined plate serving as an inwardly partitioned space, it is possible to minimize an outward transfer of a noise generated from the collision of the water on a wall surface. And also, since the apparatus rotates under water, an operating noise generated during the operation can be minimized.

In addition, by widening the outlet opening sideward to a maximum extent without interfering the water tank, the amount of air to be discharged increases and, thus, a comparatively large amount of the clean air can be discharged for the number of revolutions of a small-sized blower. Accordingly, indoor air in a wide space can be cleaned with a small-sized air cleaner having a small output, thereby enabling to reduce a cost required for cleaning air.

Since air supplied by the blower is discharged into water through a plurality of discharge holes and an outlet opening, a discharge pressure is distributed and, also, a portion to be contacted with water is distributed. As a result, water movement is reduced and, further, a noise generated during a driving of the air cleaner is reduced.

Due to the aforementioned effects, an air cleaning performance of the air cleaner is improved while minimizing a product size. Accordingly, it is possible to improve a compatibility of a place where the air cleaner is installed, which provides a convenience to users.

While the invention has been shown and described with respect to the preferred embodiments, it will be understood by those skilled in the art that various changes and modification may be made without departing from the scope of the invention as defined in the following claims.

What is claimed is:

1. A wet type air cleaner comprising:
   a housing accommodating therein water;
   a blower having a fan for downwardly transferring air, installed above the water in the housing;
   an outer guide portion for transferring the air downwardly transferred by the blower into the water, connected to the blower as a unit;
   a driving unit for rotating the blower and the outer guide portion as a unit; and
   a plurality of discharge holes formed on a circumferential bottom surface of the outer guide portion,
   wherein the air downwardly transferred by the blower is dispersed into the water in the housing through the discharge holes.

2. The wet type air cleaner of claim 1, further comprising:
   an inner guide portion in which an inlet opening provided at a lower portion thereof is submerged into the water in the housing, the inner guide portion having a cross sectional area becoming wider toward an upper portion thereof; and
   a water spraying unit connected to an upper end of the inner guide portion while communicating with outside,
   wherein the water is upwardly introduced from the inlet opening of the inner guide portion by a centrifugal force of the rotation of the motor and sprayed from the water spraying unit toward a radial direction of the water spraying unit.

3. The wet type air cleaner of claim 2, wherein a lower end portion of the inner guide portion is more extended downwardly than that of the outer guide portion.

4. The wet type air cleaner of claim 1, wherein the outer guide portion rotates with the blower while being coupled therewith, and also is outwardly and downwardly inclined.

5. The wet type air cleaner of claim 1, wherein a plurality of outer guide portions are arranged at a regular interval; a connecting unit for connecting an upper end of the respective outer guide portions is provided; and gaps between the respective outer guide portions form the discharge holes.

6. The wet type air cleaner of claim 5, wherein the connecting unit includes:
   a fixing ring formed at the upper end of each of the outer guide portions as a unit; and
   a plurality of supporting plates arranged at regular intervals, for connecting the fixing ring.

7. The wet type air cleaner of claim 6, wherein the supporting plates are formed in a wing shape of a fan.

* * * * *